US010205990B2

(12) United States Patent
Aruga et al.

(10) Patent No.: US 10,205,990 B2
(45) Date of Patent: Feb. 12, 2019

(54) DEVICE FOR SENDING OR RECEIVING VIDEO, METHOD FOR CONTROLLING DEVICE, AND COMPUTER PROGRAM

(71) Applicant: SEIKO EPSON CORPORATION, Tokyo (JP)

(72) Inventors: Naoto Aruga, Okaya (JP); Keiichi Okano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 15/525,376

(22) PCT Filed: Nov. 5, 2015

(86) PCT No.: PCT/JP2015/005558
§ 371 (c)(1),
(2) Date: May 9, 2017

(87) PCT Pub. No.: WO2016/079942
PCT Pub. Date: May 26, 2016

(65) Prior Publication Data
US 2017/0339455 A1    Nov. 23, 2017

(30) Foreign Application Priority Data
Nov. 17, 2014 (JP) .................................. 2014-232749

(51) Int. Cl.
*G06F 15/16* (2006.01)
*H04N 21/4363* (2011.01)
(Continued)

(52) U.S. Cl.
CPC ... *H04N 21/43637* (2013.01); *G02B 27/0172* (2013.01); *G06F 3/1454* (2013.01);
(Continued)

(58) Field of Classification Search
CPC ....... H04N 21/43637; H04N 21/41407; H04N 21/436; H04N 21/4126; G02B 27/0172;
(Continued)

(56) References Cited

U.S. PATENT DOCUMENTS

2006/0143679 A1    6/2006  Yamada et al.
2012/0008052 A1    1/2012  Funabiki et al.
(Continued)

FOREIGN PATENT DOCUMENTS

EP    2 104 328 A1    9/2009
JP    2012-044429 A    3/2012
(Continued)

OTHER PUBLICATIONS

Feb. 9, 2016 International Search Report issued in International Patent Application No. PCT/JP2015/005558.
(Continued)

*Primary Examiner* — Kyu Chae
(74) *Attorney, Agent, or Firm* — Oliff PLC

(57) ABSTRACT

A device for sending or receiving a video according to a video wireless transmission standard for transmitting a video via one-to-one wireless communication, includes: a connection control unit which controls establishment of connection according to the video wireless transmission standard between the device and a connection destination device; and a state changing unit which changes the state of one of the device and the connection destination device prior to the establishment of the connection, if both of the device and the connection destination device are in a sending-side state of functioning as a sending-side device of the video, or if both of the device and the connection destination device are in a receiving-side state of functioning as a receiving-side device of the video.

10 Claims, 10 Drawing Sheets

(51) Int. Cl.
*H04N 21/436* (2011.01)
*G02B 27/01* (2006.01)
*G06F 3/14* (2006.01)
*H04N 21/414* (2011.01)
*H04W 84/12* (2009.01)
*H04N 21/41* (2011.01)

(52) U.S. Cl.
CPC ..... *H04N 21/41407* (2013.01); *H04N 21/436* (2013.01); *G02B 2027/014* (2013.01); *G02B 2027/0178* (2013.01); *H04N 21/4126* (2013.01); *H04W 84/12* (2013.01)

(58) Field of Classification Search
CPC ...... G02B 2027/014; G02B 2027/0178; G06F 3/1454; H04W 84/12
See application file for complete search history.

(56) References Cited

U.S. PATENT DOCUMENTS

| | | | | |
|---|---|---|---|---|
| 2012/0115519 | A1* | 5/2012 | Funabiki | H04N 17/004 455/500 |
| 2012/0129471 | A1* | 5/2012 | Akita | H04B 1/44 455/78 |
| 2012/0243524 | A1 | 9/2012 | Verma et al. | |
| 2013/0002701 | A1 | 1/2013 | Ida | |
| 2014/0055678 | A1* | 2/2014 | Endo | H04N 21/41407 348/706 |

FOREIGN PATENT DOCUMENTS

| | | |
|---|---|---|
| JP | 2013-511236 A | 3/2013 |
| JP | 2014-027360 A | 2/2014 |
| WO | 2005/006740 A1 | 1/2005 |
| WO | 2011/048778 A1 | 4/2011 |
| WO | 2011/062404 A2 | 5/2011 |
| WO | 2013/176041 A1 | 11/2013 |

OTHER PUBLICATIONS

Jun. 18, 2018 Search Report issued in European Patent Application No. 15861623.5.
Wi-Fi Alliance. "Wi-Fi Certified Miracast: Extending the Wi-Fi experience to seamless video display," Sep. 19, 2012.

* cited by examiner

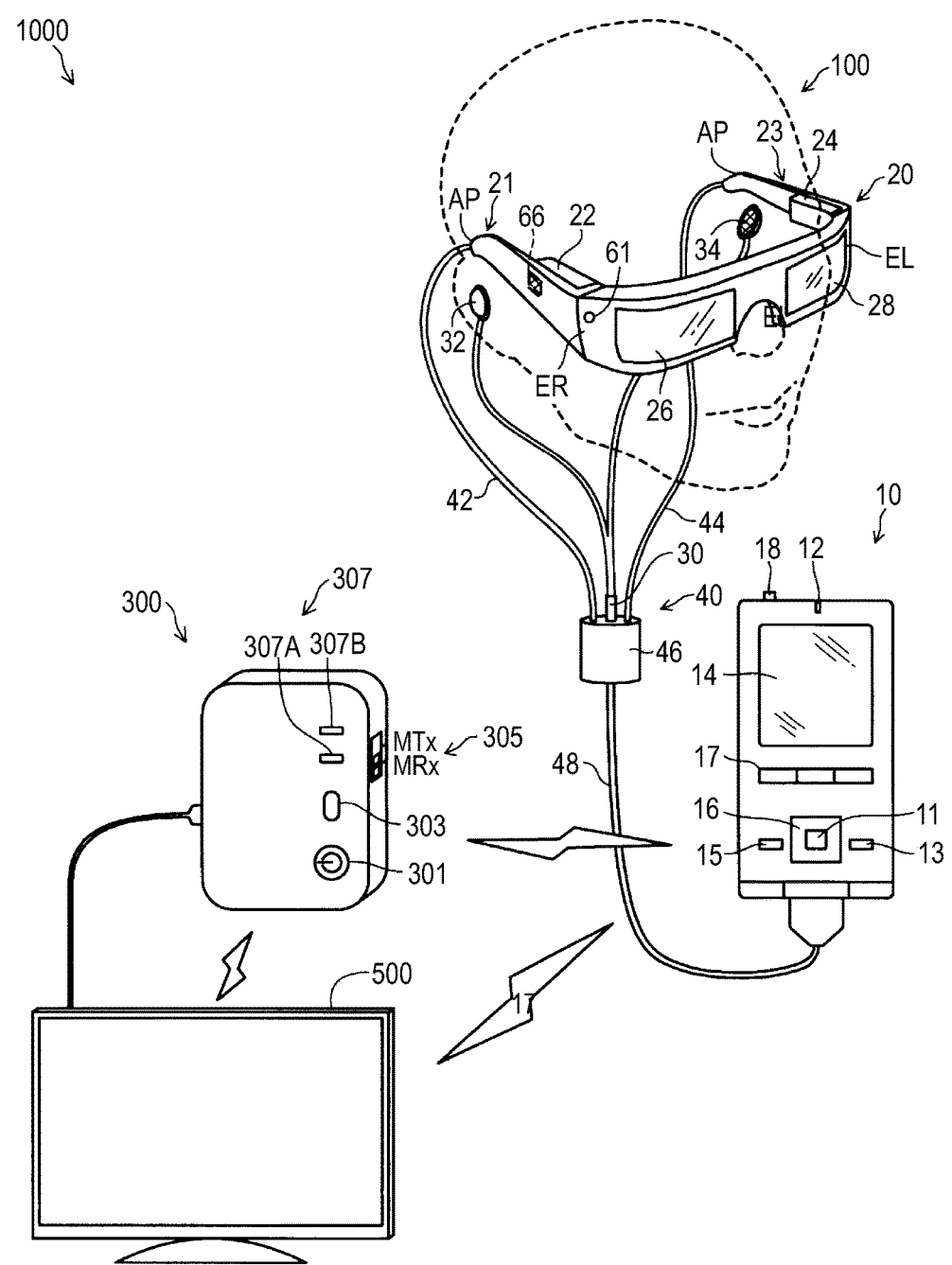
[FIG.1]

[FIG.2]
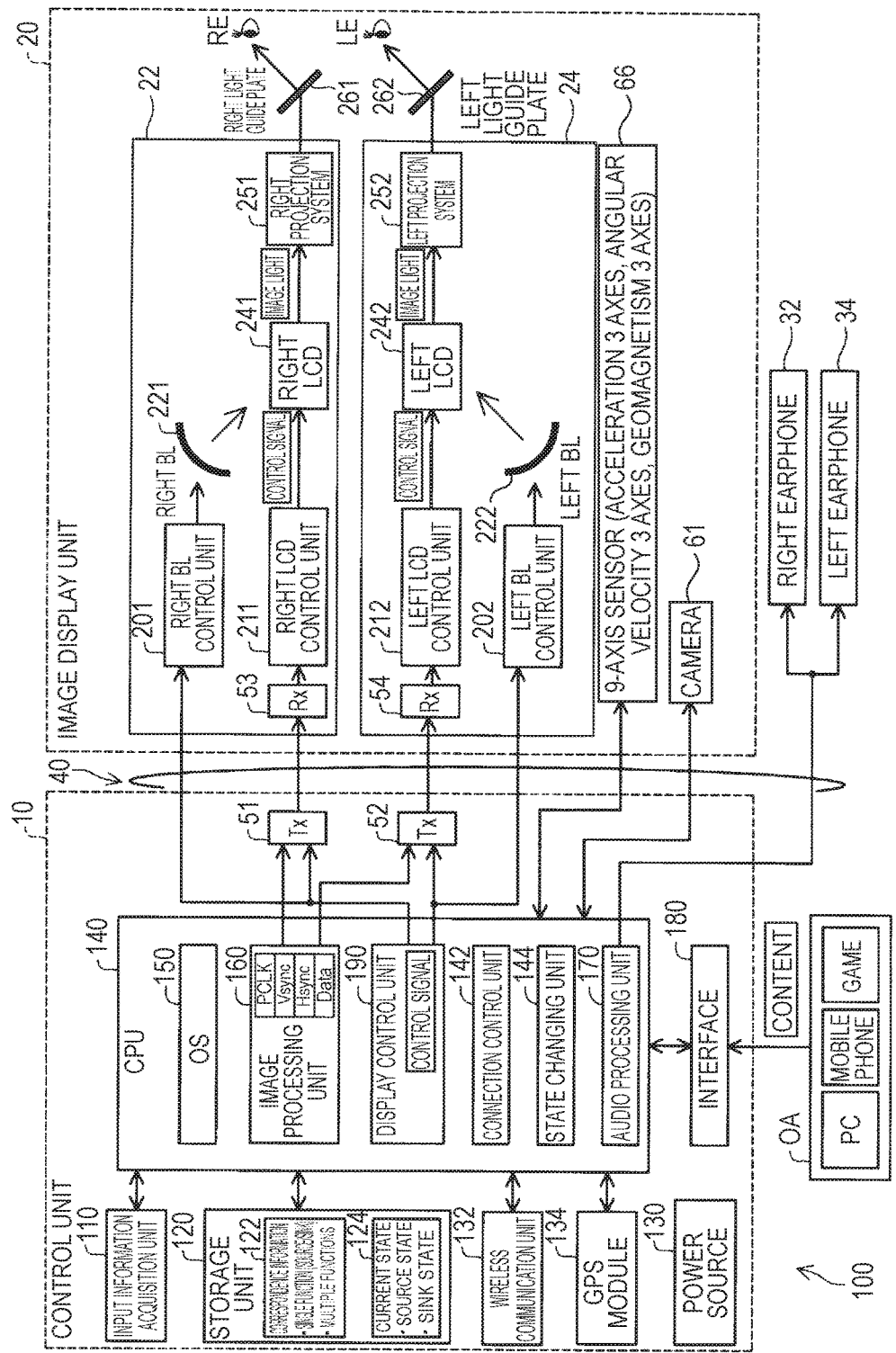

[FIG.3]
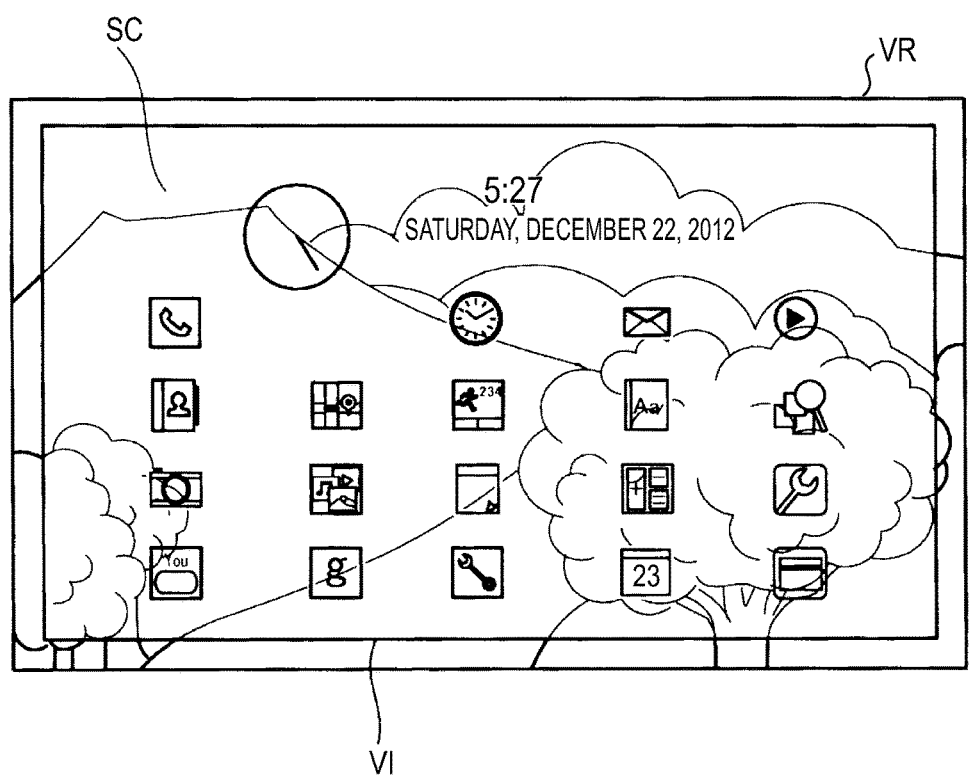

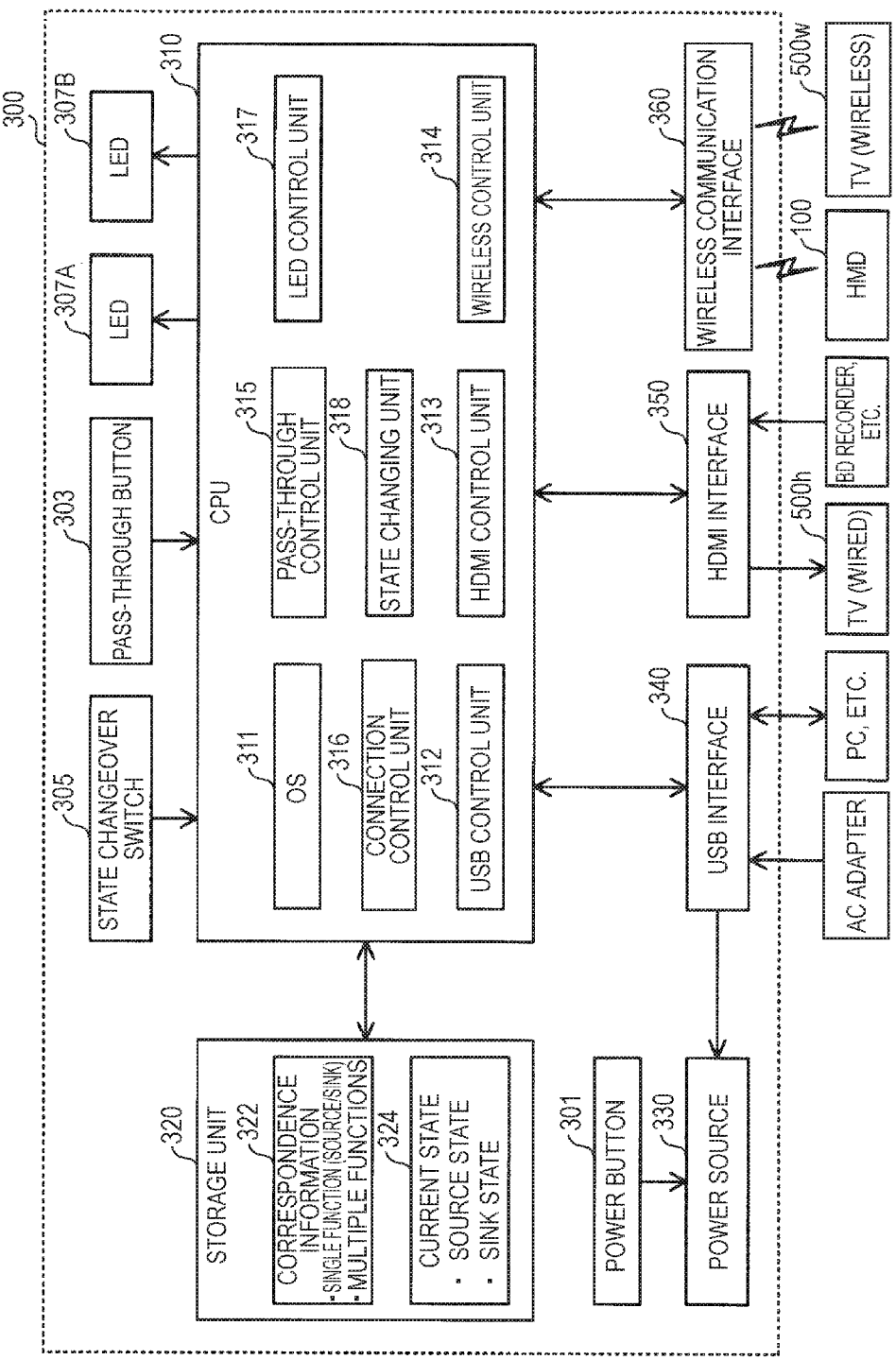

[FIG.5]
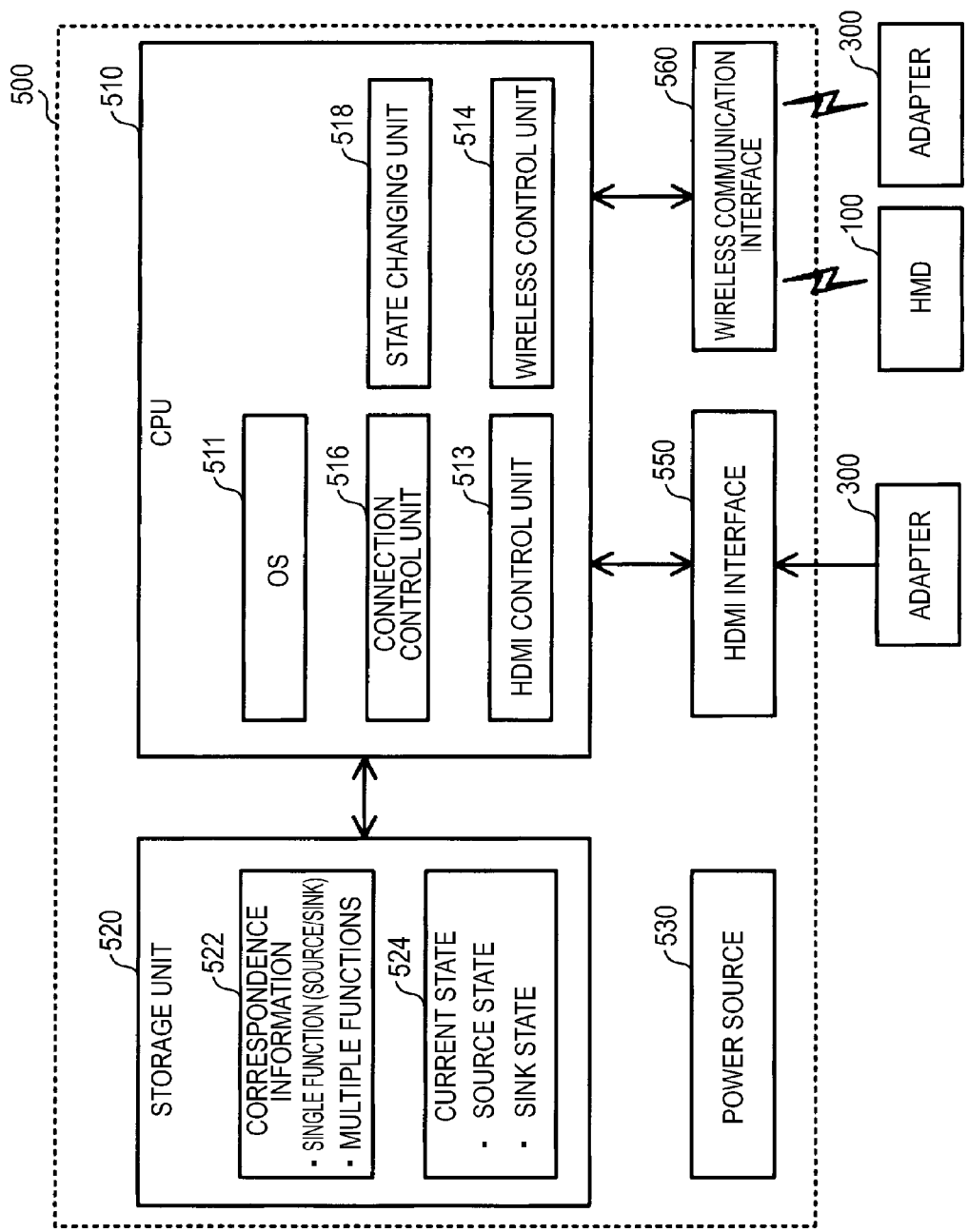

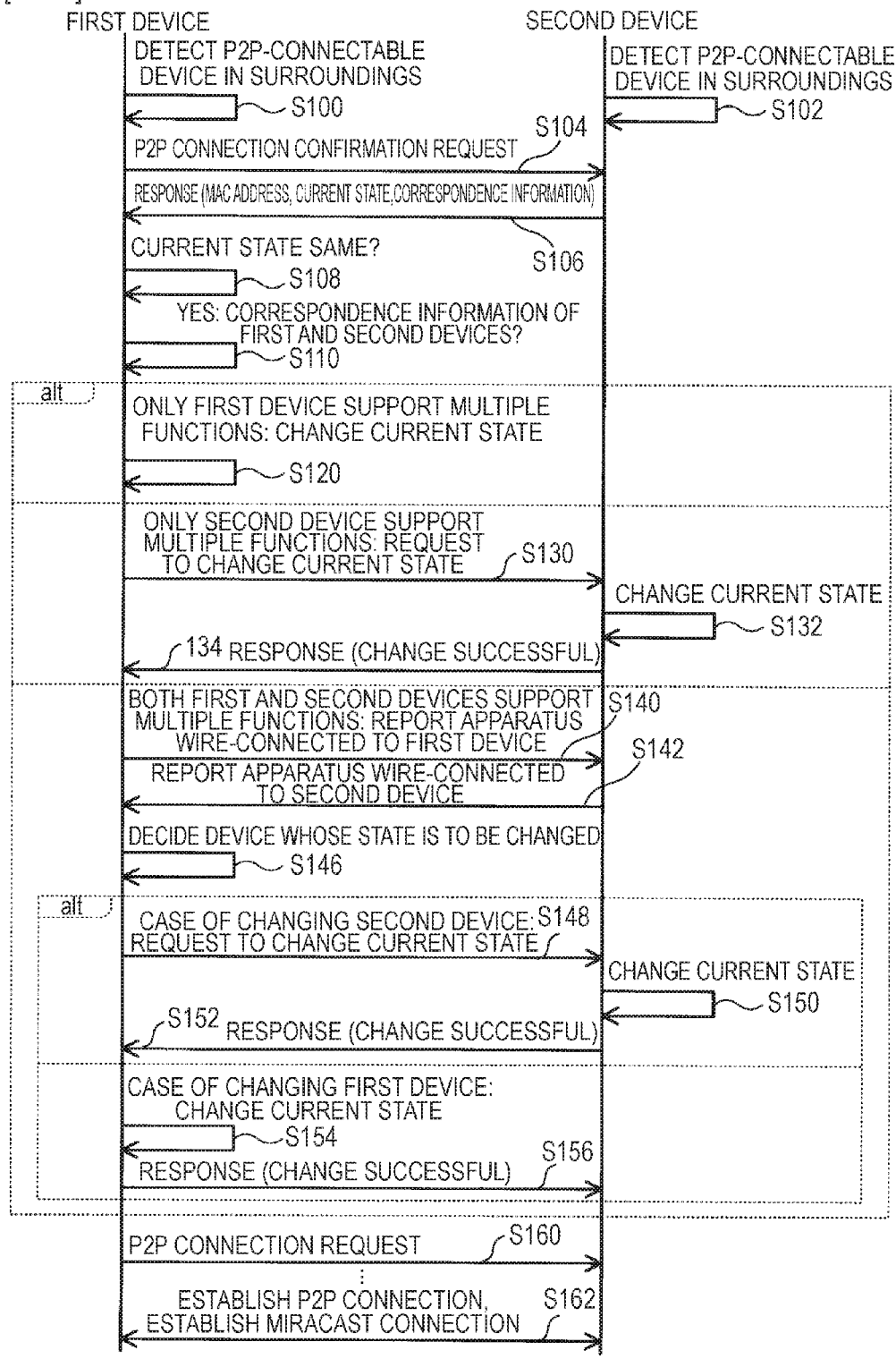

[FIG.7]
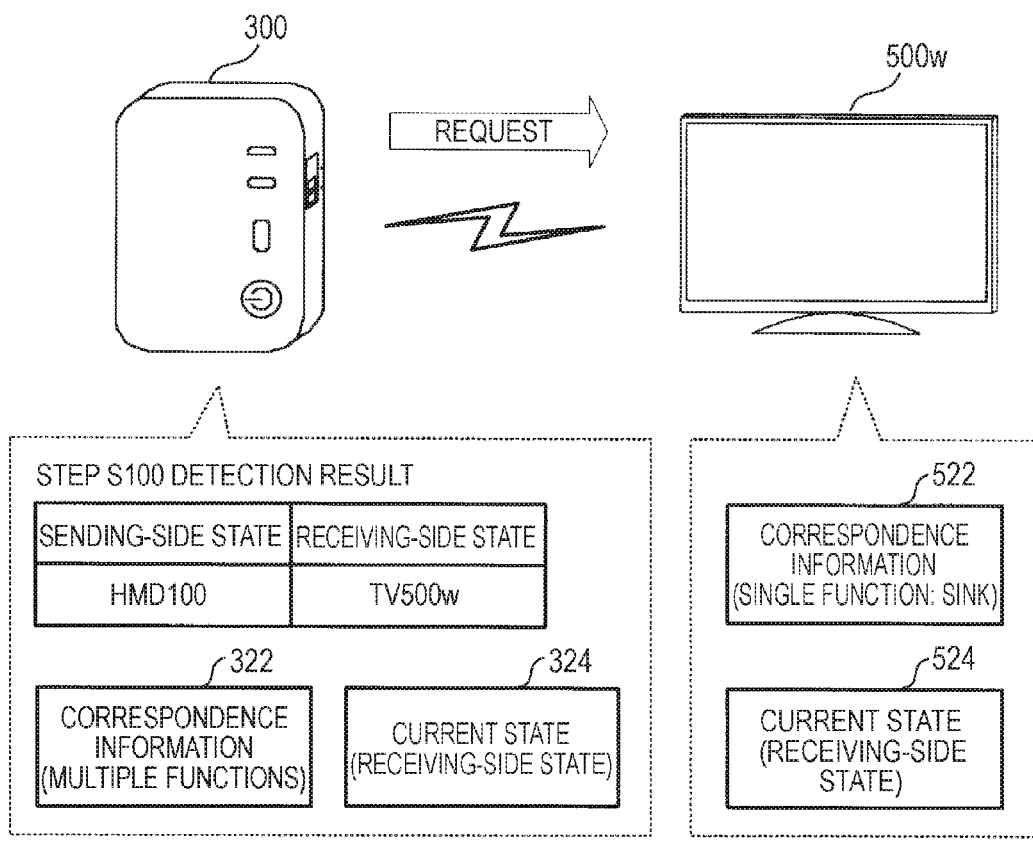

[FIG.8]
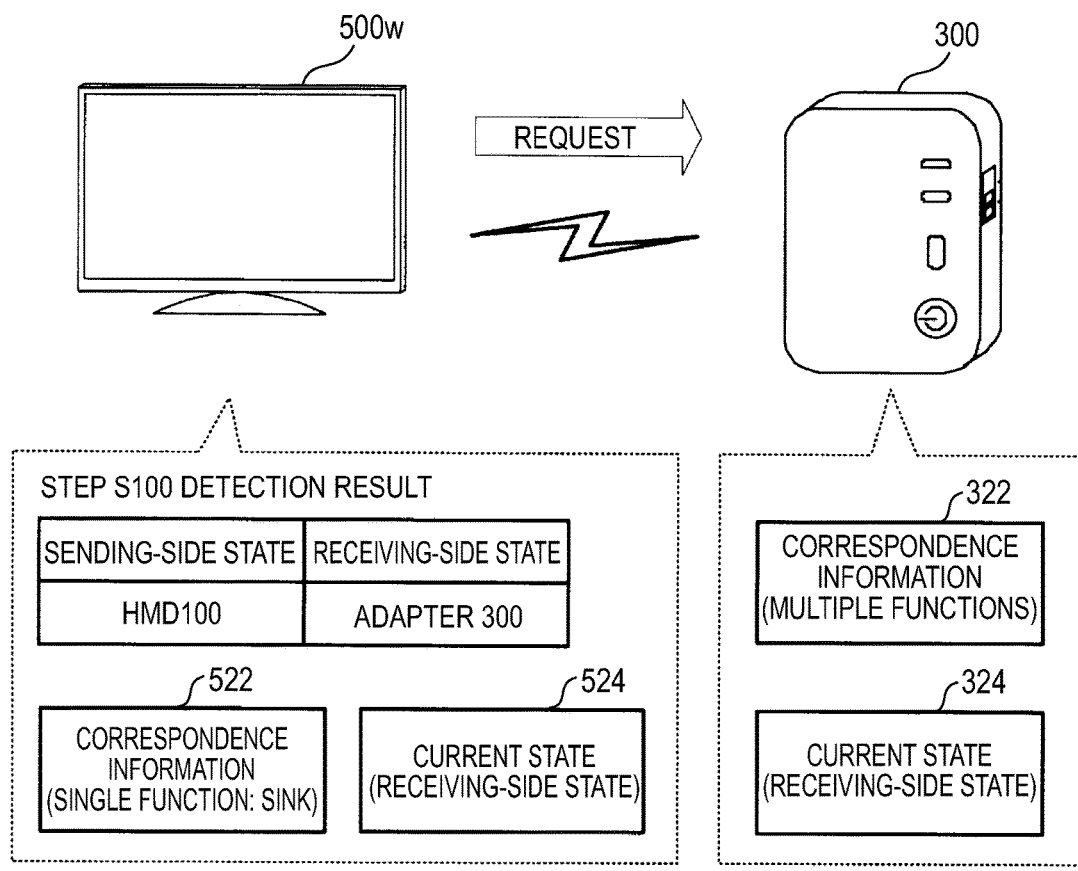

[FIG.9]
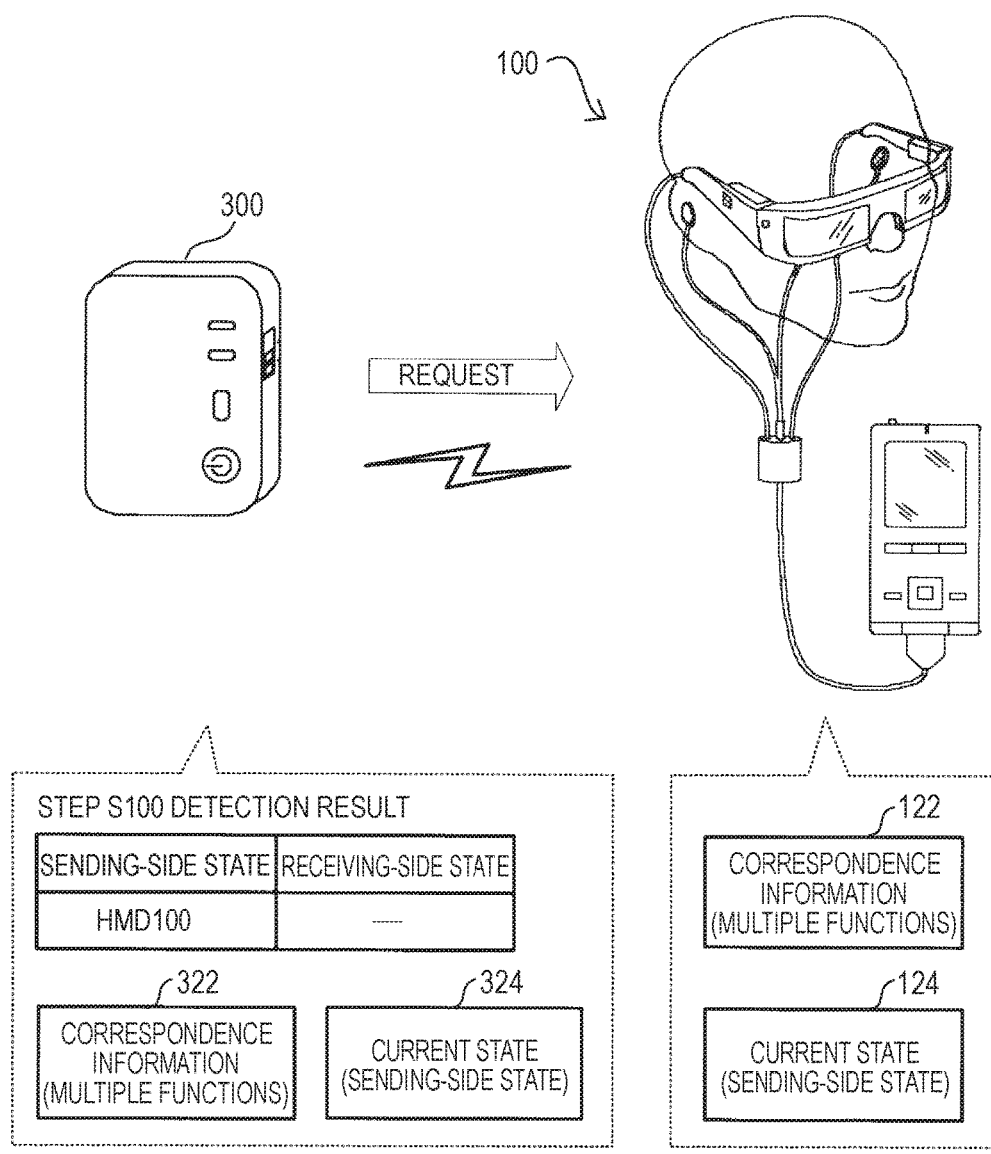

[FIG.10]
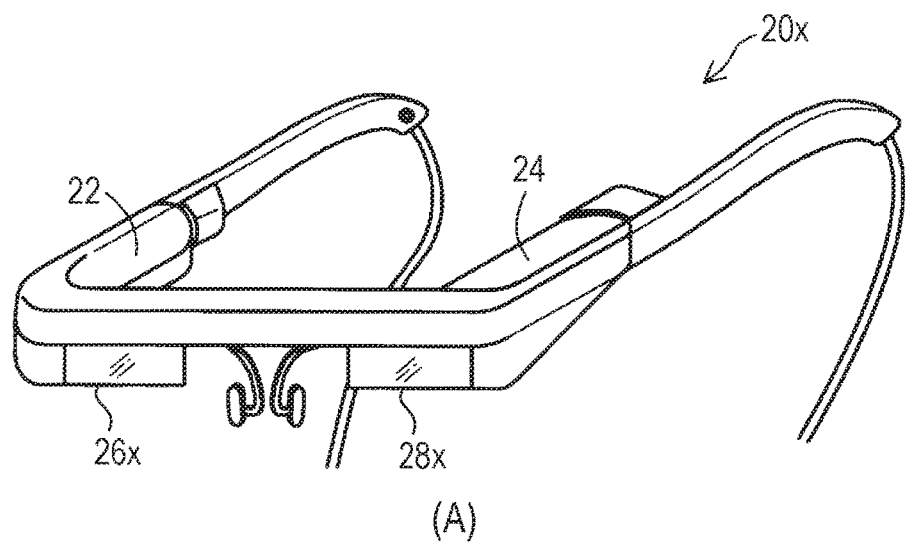
(A)
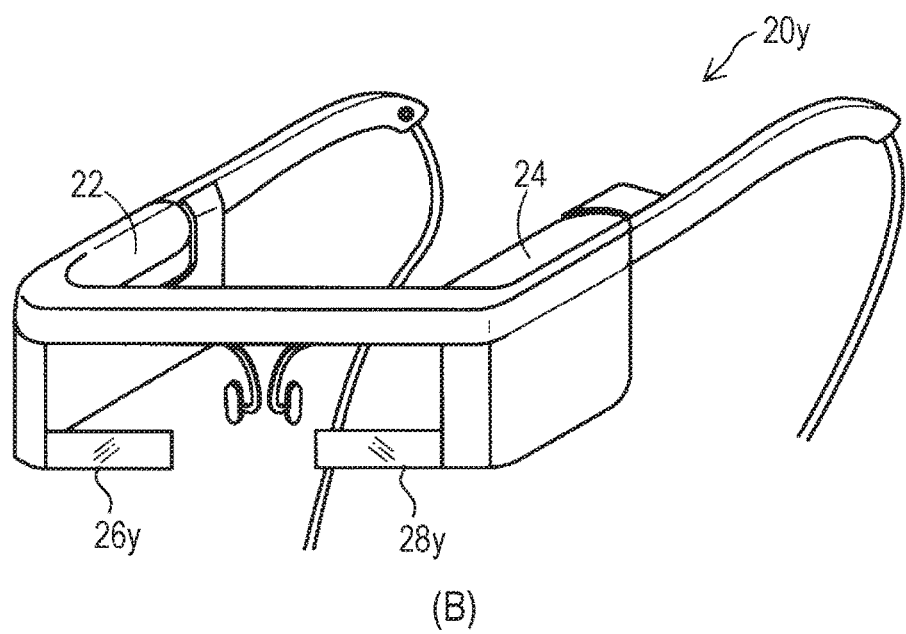
(B)

DEVICE FOR SENDING OR RECEIVING VIDEO, METHOD FOR CONTROLLING DEVICE, AND COMPUTER PROGRAM

TECHNICAL FIELD

The present invention relates to a device for sending or receiving a video according to a video wireless transmission standard for transmitting a video via one-to-one wireless communication.

BACKGROUND ART

As a video wireless transmission standard for transmitting a video or audio via one-to-one direct wireless communication, there is "Miracast" defined by Wi-Fi Alliance, for example. According to Miracast, from a device having a video output function, a video can be sent to and displayed on a device having a video display function, utilizing one-to-one wireless communication.

Under Miracast, the device having the video output function is called a "source device" or "sending-side device". As the source device, a BD (Blue-ray Disc; Blu-ray being a trademark registered) recorder, smartphone or the like may be given as an example. Meanwhile, the device having the video display function is called a "sink device" or "receiving-side device". As the sink device, a television (TV), display or the like may be given as an example. Under Miracast, Wi-Fi Direct is used as a method for establishing connection between the source device and the sink device via one-to-one wireless communication. PTL 1 discloses a technique in which, in a system supporting WFD (Wi-Fi display; another name of Miracast), a first WFD device corresponding to the source device searches for a second WFD device corresponding to the sink device.

CITATION LIST

Patent Literature

PTL 1: JP-T-2013-511236
PTL 2: JP-A-2012-44429

SUMMARY OF INVENTION

Technical Problem

Some of devices supporting Miracast have both of the function as the source device and the function as the sink device and can execute these, switching between them, such as an adapter, smartphone, head-mounted display or the like for Miracast, for example. Traditionally, the switching between functions in such a device is carried out based on a manual operation by the user, such as operating a switch provided on the casing of the device or designating a function to be executed from a menu within the device.

However, there is a problem that the user finds it troublesome to switch between functions based on the manual operation. In this respect, the techniques disclosed in PTL 1 and PTL 2 take into no consideration the execution of the function as the source device and the function as the sink device, switching between them. Such a problem is not limited to the device conforming to Miracast but is a problem common to devices in general which send or receive a video according to a certain video wireless transmission standard for transmitting a video via one-to-one wireless communication.

Therefore, it is desired that the switching between the function as the sending-side device (source device) and the function as the receiving-side device (sink device) should be automated in a device for sending or receiving a video according to a video wireless transmission standard for transmitting a video via one-to-one wireless communication.

Solution to Problem

The invention is made in order to solve at least a part of the foregoing problems and can be realized in the following forms.

(1) According to an embodiment of the invention, a device for sending or receiving a video according to a video wireless transmission standard for transmitting a video via one-to-one wireless communication is provided. This device includes: a connection control unit which controls establishment of connection according to the video wireless transmission standard between the device and a connection destination device; and a state changing unit which changes the state of one of the device and the connection destination device prior to the establishment of the connection, if both of the device and the connection destination device are in a sending-side state of functioning as a sending-side device of the video, or if both of the device and the connection destination device are in a receiving-side state of functioning as a receiving-side device of the video.

Under the video wireless transmission standard for transmitting a video via one-to-one wireless communication, one of the two devices connected on a one-to-one basis needs to function as a sending-side device (source device) and the other needs to function as a receiving-side device (sink device). If the two devices both function as a receiving-side device (sending-side device), the connection according to the video wireless transmission standard cannot be established. According to the device of this embodiment, the state changing unit changes the state (sending-side state/receiving-side state) of one of the device and the connection destination device prior to the establishment of the connection according to the video wireless transmission standard, if both of the device and the connection destination device are in the sending-side state of functioning as a sending-side device of the video, or if both of the device and the connection destination device are in the receiving-side state of functioning as a receiving-side device of the video. Therefore, the foregoing problem can be avoided and the connection according to the video wireless transmission standard can be established. Also, the state changing unit can automatically switch between the sending-side state of functioning as the sending-side device and the receiving-side state of functioning as the receiving-side device. Therefore, troubling the user can be avoided and user-friendliness can be improved. As the result of these, according to the device of this embodiment, in the device for sending or receiving a video according to the video wireless transmission standard for transmitting a video via one-to-one wireless communication, the switching between the function as a sending-side device and the function as a receiving-side device can be automated.

(2) In the device of the above embodiment, the state changing unit may acquire the state of the connection destination device and determine whether the states of both of the device and the connection destination device are the same or not, based on the acquired state.

According to the device of this embodiment, the state changing unit can determine whether the states of both of the device and the connection destination device are the same or not, based on the state acquired from the connection destination device.

(3) In the device of the above embodiment, the device may include both of the function as the sending-side device and the function as the receiving-side device. The state changing unit may change the state of the device if the states of both of the device and the connection destination device are the same.

According to the device of this embodiment, the state changing unit changes the state (sending-side state/receiving-side state) of the device itself if the device itself includes both the function as the sending-side device and the function as the receiving-side device. Thus, the automation of the switching between the function as the sending-side device and the function as the receiving-side device can be realized.

(4) In the device of the above embodiment, the device may have one of the function as the sending-side device and the function as the receiving-side device. The state changing unit may change the state of the connection destination device by sending a request to change the state of the connection destination device, to the connection destination device, if the states of both of the device and the connection destination device are the same.

According to the device of this embodiment, the state changing unit changes the state (sending-side state/receiving-side state) of the connection destination device if the device itself has only one of the function as the sending-side device and the function as the receiving-side device. Thus, the automation of the switching between the function as the sending-side device and the function as the receiving-side device can be realized.

(5) In the device of the above embodiment, the device may have both of the function as the sending-side device and the function as the receiving-side device. The connection destination device may have both of the function as the sending-side device and the function as the receiving-side device. The state changing unit may further decide a target device whose state is to be changed, from among the device and the connection destination device, if the states of both of the device and the connection destination device are the same, and may change the state of the device if the target device is the device, and may change the state of the connection destination device by sending a request to change the state of the connection destination device, to the connection destination device, if the target device is the connection destination device.

According to the device of this embodiment, the state changing unit decides one device (target device) whose state (sending-side state/receiving-side state) is to be changed, from among the device and the connection destination device, if both of the device itself and the connection destination device have both of the function as the sending-side device and the function as the receiving-side device, and changes the state of the decided one device. Thus, the automation of the switching between the function as the sending-side device and the function as the receiving-side device can be realized.

(6) In the device of the above embodiment, the state changing unit may acquire a type of an apparatus connected to the device, acquire a type of an apparatus connected to the connection destination device, and decide the target device according to the type of the apparatus connected to the device and the type of the apparatus connected to the connection destination device.

According to the device of this embodiment, the state changing unit can decide the target device whose state is to be changed, considering the types of the apparatuses connected to the device and the connection destination device, even if the device and the connection destination device are devices functioning as the sending-side device or as the receiving-side device as a "substitute for another apparatus" such as an adapter, for example.

(7) In the device of the above embodiment, the state changing unit may decide the connection destination device as the target device if a request to start the connection is sent from the device, and may decide the device as the target device if a request to start the connection is received from the connection destination device.

According to the device of this embodiment, the state changing unit may decide the side requested to start the connection according to the video wireless transmission standard, as the target device whose state is to be changed. The request to start the connection is often issued in response to a "user's operation" such as an operation to start an application, or insertion of a disc into the apparatus, for example. In this way, the state (sending-side state/receiving-side state) of the side making a request to start the connection, in other words, the device on the side where a user's operation is carried out, can be maintained and the target device whose state is to be changed can be decided in a form that reflects the user's intention better.

(8) The device of the above embodiment may further include a history storage unit which stores a history about a number of times or a time period for which the sending-side state is employed in the device in the past, and a number of times or a time period for which the receiving-side state is employed in the device in the past. The state changing unit may acquire the history of the connection destination device, and decide the target device according to the history of the device and the history of the connection destination device.

According to the device of this embodiment, the state changing unit can easily decide the target device whose state is to be changed, using the past history of the device and the connection destination device.

(9) In the device of the above embodiment, the state changing unit may decide the target device according to a predetermined priority order.

According to the device of this embodiment, the state changing unit can easily decide the target device whose state is to be changed, using the predetermined priority order.

Not all of the plurality of components of each embodiment of the invention described above is essential. In order to solve a part or the whole of the foregoing problem, or in order to achieve a part or the whole of the advantageous effects described in this specification, change, deletion, replacement with a new component, and partial deletion of a limiting content can be made to a part of the plurality of the components. Also, in order to solve a part or the whole of the foregoing problem, or in order to achieve a part or the whole of the advantageous effects described in this specification, a part or the whole of the technical features included in one embodiment of the invention described above can be combined with a part or the whole of the technical features included in another embodiment of the invention described above, thus forming a separate embodiment of the invention.

For example, one embodiment of the invention can be realized as a device having a part or the whole of the two components of the connection control unit and the state changing unit. That is, this device may or may not have the connection control unit. Also, this device may or may not have the state changing unit. Such a device can be realized as an adapter, head-mounted display device, smartphone, television, display, projector, or BD recorder, for example.

However, such a device can also be realized as other devices than these. Any part or the whole of the technical features of each embodiment of the device described above can be applied to this device. For example, an object of the device as one embodiment of the invention is to automate the switching between the function as the sending-side device and the function as the receiving-side device in a device for sending or receiving a video according to the video wireless transmission standard for transmitting a video via one-to-one wireless communication. However, with respect to this device, miniaturization of the device, improvement in user-friendliness, lower cost of manufacturing the device, resource saving, easier manufacturing, and the like are demanded.

Also, the invention can be realized in various forms. For example, the invention can be realized in the form of a device for sending or receiving a video according to a video wireless transmission standard for transmitting a video via one-to-one wireless communication, a method for controlling the same device, a system including the same device, a computer program for realizing the functions of these method, device, and system, and a storage medium storing the computer program, or the like.

BRIEF DESCRIPTION OF DRAWINGS

FIG. 1 is a view showing the schematic configuration of a video display system according to an embodiment of the invention.

FIG. 2 is a block diagram functionally showing the configuration of an HMD 100.

FIG. 3 is an explanatory view showing an example of a virtual image visually recognized by a user.

FIG. 4 is a block diagram functionally showing the configuration of an adapter 300.

FIG. 5 is a block diagram functionally showing the configuration of a TV 500.

FIG. 6 is a sequence chart showing procedures of initial processing.

FIG. 7 is a view for explaining initial processing in the case where the execution agent is the adapter 300.

FIG. 8 is a view for explaining initial processing in the case where the execution agent is the TV 500.

FIG. 9 is a view for explaining initial processing in the case where the execution agent is the HMD 100.

FIG. 10 is an explanatory view showing the external configuration of an HMD according to a modification.

DESCRIPTION OF EMBODIMENTS

A. Embodiment:
A-1. Configuration of Video Display System:

FIG. 1 is a view showing the schematic configuration of a video display system according to an embodiment of the invention. A video display system 1000 includes a head-mounted display device 100 (hereinafter also referred to as "HMD") 100, a Miracast adapter (hereinafter also referred to as "adapter") 300, and a display device (hereinafter also referred to as "TV") 500.

The video display system 1000 in this embodiment can transmit (hereinafter simply referred to as "send") a video or the like to and cause the video or the like to be displayed or played back on a device having a display function for a video or the like, from a device having an output function for a video or the like, in conformity with a video wireless transmission standard called "Miracast" defined by Wi-Fi Alliance. The sending under Miracast can be applied to any of the sending of video information only, the sending of information including video information and audio information, and the sending of audio information only. Therefore, the term "video" in the description below is intended to include "audio" as well, and the term "display" is intended to include "play back".

Under Miracast, a device having a video output function is called a "source device" or "sending-side device". Meanwhile, a device having a video display function is called a "sink device" or "receiving-side device".

The sending and displaying of a video according to Miracast roughly include the following procedures a1 to a4.

(a1) Connection via one-to-one direct wireless communication (hereinafter simply referred to as "P2P connection") is established between the source device and the sink device. In this embodiment, WiFi-Direct is used to establish P2P connection.

(a2) Connection conforming to the Miracast system (hereinafter simply referred to as "Miracast connection") is established between the source device and the sink device. The Miracast connection is established via the P2P connection established by the procedure a1.

(a3) The source device sends a video via the Miracast connection established by the procedure a2.

(a4) The sink device displays the video received via the Miracast connection established by the procedure a2.

In the example of FIG. 1, the HMD 100 has both of the function as the source device and the function as the sink device and can execute these functions, switching between them. The TV 500 can function as the sink device on its own, if the TV 500 has both of a wireless connection function and a Miracast connection function. Meanwhile, if the TV 500 lacks one of the wireless connection function and the Miracast connection function, the TV 500 can indirectly function as the sink device by connecting to the source device via the adapter 300. In this case, it is the adapter 300 that directly functions as the sink device.

In the example of FIG. 1, a BD (Blu-ray Disc) recorder, not illustrated, similarly to the TV 500, can function as the source device if the BD recorder has both of the wireless connection function and the Miracast connection function. Meanwhile, if the BD recorder lacks one of the wireless connection function and the Miracast connection function, the BD recorder can indirectly function as the source device by connecting to the sink device via the adapter 300. In this case, it is the adapter 300 that directly functions as the source device. In this way, the adapter 300 can function as the source device and can also function as the sink device, by having another apparatus connected thereto.

For example, a case where the user wants to use the HMD 100 as the source device and the TV 500 as the sink device is considered. In such a case, traditionally, the user carries out a "switching operation" in which the function of the HMD 100 as the sink device is enabled. The TV 500 can only function as the sink device and therefore needs no switching. Similarly, a case where the user wants to use the adapter 300 to which the BD recorder not illustrated is connected, as the source device, and the HMD 100 as the sink device, is considered. In such a case, too, traditionally, the user carries out a switching operation" in which the function of the adapter 300 as the source device is enabled and in which the function of the HMD 100 as the sink device is enabled.

The video display system 1000 in this embodiment can execute "initial processing" to automate the "switching operation" described above, which is needed prior to the establishment of Miracast connection. The execution agent of the initial processing may be the HMD 100, the adapter 300, or the TV 500. Details of the initial processing will be described later.

A-1-1. Configuration of Head-Mounted Display Device:

The HMD 100 is an optical transmission-type head-mounted display with which the user can directly visually recognize the external scenery at the same time as visually recognizing a virtual image. The HMD 100 includes an image display unit 20 which allows the user to visually recognize a virtual image in the state of being mounted on the user's head, and a control unit (controller) 10 which controls the image display unit 20. In the following description, a virtual image which the user visually recognizes with the HMD 100 is also referred to as a "display image", as a matter of convenience. Also, the emitting of image light generated based on image data by the HMD 100 is paraphrased as "displaying an image".

A-1-1-1. Configuration of Image Display Unit

FIG. 2 is a block diagram functionally showing the configuration of the HMD 100. The image display unit 20 is a mounted unit mounted on the user's head, and in this embodiment, in the shape of eyeglasses (FIG. 1). The image display unit 20 includes a right holding section 21, a right display drive section 22, a left holding section 23, a left display drive section 24, aright optical image display section 26, a left optical image display section 28, a camera 61, and a nine-axis sensor 66. Hereinafter, the positional relation and functions of each section of the image display unit 20 in the state where the user wears the image display unit 20 will be described.

As shown in FIG. 1, the right optical image display section 26 and the left optical image display section 28 are arranged to be situated in front of the right eye and left eye of the user, respectively. One end of the right optical image display section 26 and one end of the left optical image display section 28 are connected together at a position corresponding to the glabella of the user. As shown in FIG. 2, the right optical image display section 26 has a right light guide plate 261 and a light control plate (not illustrated). The right light guide plate 261 is formed of a light-transmissive resin material or the like and guides image light outputted from the right display drive section 22 to the right eye RE of the user while reflecting the image light along a predetermined optical path. The light control plate is a thin plate-like optical element and is arranged to cover the front side (side opposite to the side of the user's eye) of the image display unit 20. The light control plate protects the right light guide plate 261 and restrains damage, stain and the like. Also, if the light transmittance of the light control plate is adjusted, the amount of external light entering the user's eyes can be adjusted and the visibility of the virtual image can be adjusted. However, the light control plate can be omitted.

The left optical image display section 28 has a left light guide plate 262 and a light control plate (not illustrated). Details of these are similar to those of the right optical image display section 26. The right optical image display section 26 and the left optical image display section 28 are generally referred to simply as an "optical image display section". The optical image display section can use any method as long as the optical image display section forms a virtual image in front of the user's eyes, using image light. For example, the optical image display section may be realized using a diffraction grating or may be realized using a semi-transmissive reflection film.

As shown in FIG. 1, the right holding section 21 is provided, extending from the other end ER of the right optical image display section 26 to a position corresponding to the temporal region of the user. The left holding section 23 is provided, extending from the other end EL of the left optical image display section 28 to a position corresponding to the temporal region of the user. The right holding section 21 and the left holding section 23 hold the image display unit 20 on the head of the user, like the temples of eyeglasses. The right holding section 21 and the left holding section 23 are generally referred to simply as a "holding section".

As shown in FIG. 1, the right display drive section 22 is arranged on the inner side (side facing the head of the user) of the right holding section 21. The left display drive section 24 is arranged on the inner side of the left holding section 23. As shown in FIG. 2, the right display drive section 22 includes a receiving unit (Rx) 53, a right backlight (BL) control unit 201 and right backlight (BL) 221 functioning as a light source, a right LCD (liquid crystal display) control unit 211 and right LCD 241 functioning as a display element, and a right projection system 251. The right backlight control unit 201, the right LCD control unit 211, the right backlight 221, and the right LCD 241 are generally called an "image light generation unit".

The receiving unit 53 functions as a receiver for serial transmission between the control unit 10 and the image display unit 20. The right backlight control unit 201 drives the right backlight 221, based on an inputted control signal. The right backlight 221 is a light emitting member such as an LED light emitting diode) or electroluminescence (EL), for example. The right LCD control unit 211 drives the right LCD 241, based on a clock signal PCLK, a vertical synchronization signal VSync, a horizontal synchronization signal HSync, and image data Data for the right eye, inputted via the receiving unit 53. The right LCD 241 is a transmission-type liquid crystal panel in which a plurality of pixels is arranged in the form of a matrix. The right projection system 251 is a collimating lens which forms the image light emitted from the right LCD 241 into a parallel luminous flux.

The left display drive section 24 includes a receiving unit (Rx) 54, a left backlight (BL) control unit 202 and left backlight (BL) 222 functioning as a light source, a left LCD control unit 212 and left LCD 242 functioning as a display element, and a left projection system 252. Details of these are similar to those of the right display drive section 22. The right display drive section 22 and the left display drive section 24 are generally referred to simply as a "display drive section".

As shown in FIG. 1, the camera 61 is arranged at a position corresponding to a part above the outer corner of the right eye of the user. The camera 61 picks up an image of the external scenery (scenery of the outside) in the front side direction of the image display unit 20, in other words, in the field-of-view direction of the user in the state of wearing the HMD 100, and acquires an external scenery image. Since the camera 61 is a so-called visible-light camera, the external scenery image is an image showing the shape of an object via visible light radiated from the object. While the camera 61 in this embodiment is a single-lens camera, a so-called stereo camera may be employed.

As shown in FIG. 1, the nine-axis sensor 66 is arranged at a position corresponding to the right temple of the user. The nine-axis sensor 66 is a motion sensor which detects acceleration (three axes), angular velocity (three axes), and geomagnetism (three axes). The nine-axis sensor 66 is provided in the image display unit 20 and therefore functions as a motion detection unit which detects movements of the head of the user of the head-mounted display 100 when the image display unit 20 is mounted on the user's head. Here, the movements of the head include velocity, acceleration, angular velocity, direction, and change in direction, of the head.

As shown in FIG. 1, the image display unit 20 has a connection unit 40 which connects the image display unit 20 and the control unit 10 together. The connection unit 40 includes a main body cord 48 connected to the control unit 10, a right cord 42 and a left cord 44 split from the main body cord 48, and a connection member 46 provided at the splitting point. A socket for connecting an earphone plug 30 is provided in the connection member 46. A right earphone 32 and a left earphone 34 extend from the earphone plug 30. The image display unit 20 and the control unit 10 transmit various signals via the connection unit 40. For each cord in the connection unit 40, a metal cable or optical fiber can be employed, for example.

A-1-1-2. Configuration of Control Unit:

The control unit 10 is a device for controlling the HMD 100. As shown in FIG. 1, the control unit 10 has an enter key 11, a lighting part 12, a display switch key 13, a track pad 14, a luminance switch key 15, a direction key 16, a menu key 17, and a power switch 18. The enter key 11 detects a press operation and outputs a signal for deciding the content operated in the control unit 10. The lighting part 12 is realized by an LED, for example, and reports the operating state (for example, power ON/OFF or the like) of the HMD 100 by its light emitting state. The display switch key 13 detects a press operation and outputs a signal for switching the content dynamic image display mode between 3D and 2D, for example.

The track pad 14 detects an operation by the user's finger on the operation surface of the track pad 14 and outputs a signal corresponding to the detection content. As the track pad 14, various methods such as an electrostatic method, pressure detection method, or optical method can be employed. The luminance switch key 15 detects a press operation and outputs a signal to increase or decrease the luminance on the image display unit 20. The direction key 16 detects a press operation on a key corresponding to the up, down, left or right direction and outputs a signal corresponding to the detection content. The power switch 18 detects a slide operation of the switch and thereby switches the power switch-on state of the HMD 100.

As shown in FIG. 2, the control unit 10 includes an input information acquisition unit 110, a storage unit 120, a power source 130, a wireless communication unit 132, a GPS module 134, a CPU 140, an interface 180, and sending units (Tx) 51 and 52. The respective parts are interconnected via a bus, not illustrated.

The input information acquisition unit 110 acquires signals corresponding to operation inputs to the enter key 11, the display switch key 13, the track pad 14, the luminance switch key 15, the direction key 16, the menu key 17, and the power switch 18. The input information acquisition unit 110 can acquire operation inputs using various methods other than the above. For example, an operation input from a foot switch (switch operated by the user's foot) may be acquired. For example, an operation input based on a command corresponding to the line of sight or movement of the eyes of the user detected by a line-of-sight detection unit (not illustrated) may be acquired. This command may be set in such a way as to be able to be added by the user. For example, a gesture of the user may be detected using the camera 61, and an operation input based on a command corresponding to the gesture may be acquired. In the detection of a gesture, a fingertip of the user, a ring on the user's hand, medical equipment on the user's hand or the like can be used as a mark for motion detection. If operation inputs by these methods can be acquired, the input information acquisition unit 110 can acquire operation inputs from the user even in work which it is difficult for the user to release his/her hands from.

The storage unit 120 is made up of a ROM, RAM, DRAM, hard disk or the like. In the storage unit 120, various computer programs such as an operating system (OS) are stored. Also, in the storage unit 120, correspondence information 122 and current state 124 are stored.

As the correspondence information 122, information indicating a function that can be supported by the HMD 100 under Miracast is stored in advance. The "function that can be supported" is one of the following b1 to b3.

(b1) Single function (source device): the HMD can function only as the source device.

(b2) Single function (sink device): the HMD can function only as the sink device.

(b3) Multiple functions: the HMD can function both as the source device and as the sink device.

Since the HMD 100 in the embodiment can function both as the source device and as the sink device, information indicating the above b3 is stored as the correspondence information 122.

As the current state 124, information indicating whether the HMD 100 is currently in the state of functioning as the source device (hereinafter also referred to as a "sending-side state") or in the state of functioning as the sink device (hereinafter also referred to as a "receiving-side state") is stored.

The power source 130 supplies electricity to each part of the HMD 100. As the power source 130, a secondary battery can be used, for example. The wireless communication unit 132 carries out wireless communication with an external device according to a predetermined wireless communication standard. The predetermined wireless communication standard is infrared, short-range wireless communication exemplified by Bluetooth (trademark registered), wireless LAN exemplified by IEEE 802.11, or the like, for example. The GPS module 134 receives signals from GPS satellites and thereby detects the current location of the user of the HMD 100, and generates current location information indicating the current location information of the user. The current location information can be realized by coordinates indicating latitude and longitude.

The CPU 140 reads out and executes a computer program stored in the storage unit 120 and thereby functions as a connection control unit 142, a state changing unit 144, an OS 150, an image processing unit 160, an audio processing unit 170, and a display control unit 190.

The connection control unit 142 controls the establishment of Miracast connection (the foregoing procedures a1, a2) between the HMD 100 and an arbitrary device at a connection destination (hereinafter also referred to simply as a "connection destination device"). The state changing unit 144 controls initial processing if the execution agent of the initial processing is the HMD 100. The initial processing is processing in which a "switching operation" that is necessary prior to the establishment of Miracast connection is automatically executed. Details will be described later.

The image processing unit 160 carries out signal processing for image display. Specifically, if a content (video) is inputted via the interface 180 or the wireless communication unit 132, the image processing unit 160 generates image data Data based on the content. If image data is received from another functional unit of the HMD 100, the image processing unit 160 uses the received data as image data Data. The image processing unit 160 may execute image processing on the image data Data, such as resolution conversion processing, color tone correction processing such as adjustment of luminance and saturation, or keystone correction processing. The image processing unit 160 sends the image data Data, the clock signal PCLK, the vertical synchronization signal VSync, and the horizontal synchronization signal HSync to the image display unit 20 via the sending units 51, 52.

The display control unit 190 generates a control signal which controls the right display drive section 22 and the left display drive section 24. Specifically, the display control unit 190 separately controls, with control signals, the drive ON/OFF of the left and right LCDs 241, 242 by the left and right LCD control units 211, 212, and the drive ON/OFF of the left and right backlights 221, 222 by the left and right backlight control units 201, 202, and thereby controls the generation and emission of image light by each of the right display drive section 22 and the left display drive section 24. The display control unit 190 sends these control signals to the image display unit 20 via the sending units 51, 52.

The audio processing unit 170 acquires an audio signal included in the content, amplifies the acquired audio signal, and supplies the audio signal to a speaker, not illustrated, of the right earphone 32, and a speaker, not illustrated, of the left earphone 34.

The interface 180 communicates with an external device OA according to a predetermined wired communication standard. The predetermined wired communication standard is wired LAN or the like exemplified by Micro USB (Universal Serial Bus), USB, HDMI (High Definition Multimedia Interface; HDMI being trademark registered), DVI (Digital Visual Interface), VGA (Video Graphics Array), composite, RS-232C (Recommended Standard 232), or IEEE 802.3, for example. As the external device OA, a personal computer PC, mobile phone terminal, game terminal or the like can be used, for example.

FIG. 3 is an explanatory view showing an example of a virtual image visually recognized by the user. As image light guided to both eyes of the user of the HMD 100 forms an image on the retinas of the user as described above, the user visually recognizes a virtual image VI. In the example of FIG. 3, the virtual image VI is the standby screen of the OS 150 of the HMD 100. The user visually recognizes an external scenery SC through the right optical image display section 26 and the left optical image display section 28. In this way, in the area where the virtual image VI is displayed, of the field of view VR, the user of the HMD 100 in the embodiment can view the virtual image VI and the external scenery SC behind the virtual image VI. Also, in the area where the virtual image VI is not displayed, of the field of view VR, the user can directly view the external scenery SC through the optical image display section.

A-1-2. Configuration of Miracast Adapter:

FIG. 4 is a block diagram functionally showing the configuration of the adapter 300. The adapter 300 includes a power button 301, a pass-through button 303, a changeover switch 305, and an LED 307, as shown in FIG. 1, and includes a CPU 310, a storage unit 320, a power source 330, a USB interface 340, an HDMI interface 350, and a wireless communication interface 360, as shown in FIG. 4. The respective parts are interconnected via a bus, not illustrated. The USB interface 340 has a USB input/output terminal, not illustrated. The HDMI interface 340 has an HDMI input terminal, not illustrated, and an HDMI output terminal, not illustrated. The wireless communication interface 360 has an antenna, not illustrated.

The power button 301 switches the operating state (operation/halt) of the adapter 300 in response to the ON/OFF of the button. The pass-through button 303 switches between selection and non-selection of a pass-through mode in response to the ON/OFF of the button. Details of the pass-through mode will be described later.

The changeover switch 305 is a switch for manually switching the operating state of the adapter 300. Specifically, if the changeover switch 305 is slid toward MTx, the adapter 300 enters into the state of functioning as the source device (sending-side state). When the adapter 300 is in the sending-side state, the adapter 300 sends a video inputted from the HDMI input terminal to the sink device, using Miracast connection. If the changeover switch 305 is slid toward MRx, the adapter 300 enters into the state of functioning as the sink device (receiving-side state). When the adapter 300 is in the receiving-side state, the adapter 300 outputs, from the HDMI output terminal, a video received from the source device using Miracast connection.

The LED 307 includes two LEDs 307A, 307B and reports the operating state of the adapter 300, for example, the ON/OFF of power, the operating state of the adapter 300 (sending-side state/receiving-side state) or the like, by the light emitting form of the two LEDs 307A, 307B.

The CPU 310 reads out and executes a computer program stored in the storage unit 320 and thereby functions as an OS 311, a USB control unit 312, an HDMI control unit 313, a wireless control unit 314, a pass-through control unit 315, a connection control unit 316, an LED control unit 317, and a state changing unit 318.

The USB control unit 312 controls communication with an apparatus connected to the USB interface 340 according to the USB standard. The HDMI control unit 313 controls communication with an apparatus connected to the HDMI interface 350 according to the HDMI standard. The wireless control unit 314 controls communication with an apparatus connected to the wireless communication interface 360 according to a predetermined wireless communication standard. The predetermined wireless communication standard is short-range wireless communication, wireless LAN or the like, for example. The LED control unit 317 controls the LEDs 307A, 307B.

The pass-through control unit 315 executes pass-through control if the pass-through button 303 is ON, that is, if the pass-through mode is selected. Specifically, the pass-through control unit 315 outputs a video inputted to the HDMI input terminal of the adapter 300, directly from the HDMI output terminal of the adapter 300.

The connection control unit 316 controls the establishment of Miracast connection between the adapter 300 and the connection destination device (the foregoing procedures a1, a2). The state changing unit 318 controls initial processing if the execution agent of the initial processing is the adapter 300. The initial processing is processing in which a "switching operation" that is needed prior to the establishment of Miracast connection is automatically executed. Details will be described later.

The storage unit 320 is made up of a ROM, RAM, DRAM, hard disk or the like. Various computer programs including an OS are stored in the storage unit 320. Also, correspondence information 322 and current state 324 are stored in the storage unit 320.

As the correspondence information 322, information indicating a function that can be supported by the adapter 300 under Miracast is stored in advance. The "function that can be supported" is one of the above b1 to b3. Since the adapter 300 in the embodiment can function both as the source device and as the sink device, information indicating the above b3 is stored as the correspondence information 322.

As the current state 324, information indicating whether the adapter 300 is currently in the state of functioning as the source device (hereinafter also referred to as a "sending-side state") or in the state of functioning as the sink device (hereinafter also referred to as a "receiving-side state") is stored.

The power source 330 supplies electricity to each part of the adapter 300. As the power source 330, a secondary battery can be used, for example.

To the USB interface 340, for example, an AC adapter for charging the power source 330, or a personal computer (PC) or the like for outputting a video to the adapter 300 or inputting a video from the adapter 300 can be connected. To the HDMI interface 350, for example, the TV 500 (FIG. 1) for inputting a video from the adapter 300, or a BD recorder or the like for outputting a video to the adapter 300 can be connected. To the wireless communication interface 360, for example, the HMD 100 (FIG. 1) for outputting a video to the adapter 300 or inputting a video from the adapter 300, or the TV 500 for inputting a video from the adapter 300 can be connected.

A-1-3. Configuration of Display Device:

FIG. 5 is a block diagram functionally showing the configuration of the TV 500. The TV 500 is a television which functions as a display device and includes a CPU 510, a storage unit 520, a power source 530, an HDMI interface 550, and a wireless communication interface 560. The respective parts are interconnected via a bus, not illustrated. The HDMI interface 550 has an HDMI input terminal, not illustrated, and an HDMI output terminal, not illustrated. The wireless communication interface 560 has an antenna, not illustrated.

The CPU 510 reads out and executes a computer program stored in the storage unit 520 and thereby functions as an OS 511, an HDMI control unit 513, a wireless control unit 514, a connection control unit 516, and a state changing unit 518.

The HDMI control unit 513 controls communication with an apparatus connected to the HDMI interface 550 according to the HDMI standard. The wireless control unit 514 controls communication with an apparatus connected to the wireless communication interface 560 according to a predetermined wireless communication standard. The predetermined wireless communication standard is short-range wireless communication, wireless LAN or the like, for example.

The connection control unit 516 controls the establishment of Miracast connection between the TV 500 and the connection destination device (the foregoing procedures a1, a2). The state changing unit 518 controls initial processing if the execution agent of the initial processing is the TV 500. The initial processing is processing in which a "switching operation" that is needed prior to the establishment of Miracast connection is automatically executed. Details will be described later.

The storage unit 520 is made up of a ROM, RAM, DRAM, hard disk or the like. In the storage unit 520, various computer programs such as an operating system (OS) are stored. Also, in the storage unit 520, correspondence information 522 and current state 524 are stored.

As the correspondence information 522, information indicating a function that can be supported by the TV 500 under Miracast is stored in advance. The "function that can be supported" is one of the foregoing b1 to b3. Since the TV 500 in the embodiment can function only as the sink device (that is, cannot function as the source device), information indicating the above b2 is stored as the correspondence information 522.

As the current state 524, information indicating whether the TV 500 is currently in the state of functioning as the source device (hereinafter also referred to as a "sending-side state") or in the state of functioning as the sink device (hereinafter also referred to as a "receiving-side state") is stored. Since the TV 500 in the embodiment can function only as the sink device, information indicating the receiving-side state is constantly stored as the current state 524.

The power source 530 supplies electricity to each part of the TV 500. As the power source 530, a secondary battery can be used, for example.

To the HDMI interface 550, for example, the adapter 300 (FIG. 1) for outputting a video to the TV 500 can be connected. To the wireless communication interface 560, for example, the HMD 100 (FIG. 1) for outputting a video to the TV 500 or inputting a video from the TV 500, or the adapter 300 for outputting a video to the TV 500 can be connected.

A-2. Initial Processing:

The initial processing is processing in which a "switching operation" that is needed prior to the establishment of Miracast connection is automatically executed. The initial processing is executed prior to the establishment of Miracast connection (the foregoing procedures a1, a2). The execution agent of the initial processing may be the HMD 100, the adapter 300, or the TV 500.

FIG. 6 is a sequence chart showing the procedures of the initial processing. The initial processing is executed by the state changing unit 144 of the HMD 100 if the HMD 100 is the execution agent, by the state changing unit 318 of the adapter 300 if the adapter 300 is the execution agent, and by the state changing unit 518 of the TV 500 if the TV 500 is the execution agent. Hereinafter, in the description of FIG. 6, the state changing unit 144 of the HMD 100, the state changing unit 318 of the adapter 300, and the state changing unit 518 of the TV 500 are not discriminated from each other and are also referred to simply as a "state changing unit". Also, in the description of FIG. 6, the device to be the execution agent of the initial processing is also called a "first device". The connection destination device with which the first device is to establish Miracast connection is also called a "second device".

In Step S100, the state changing unit of the first device detects a device in the surroundings with which the first device can establish P2P connection. Specifically, the state changing unit sets the state of the first device to the sending-side state of functioning as the source device and then detects a beacon sent off from the sink device in the surroundings. Subsequently, the state changing unit sets the state of the first device to the receiving-side state of functioning as the sink device and then detects a beacon sent off from the source device in the surroundings.

In Step S102, the second device detects a device in the surroundings with which the second device can establish P2P connection. Details are similar to Step S100.

In Step S104, the state changing unit of the first device sends a P2P connection confirmation request to the second device.

In Step S106, as a response to the confirmation request, the state changing unit of the second device sends the MAC address of the second device, the current state (sending-side state/receiving-side state) of the second device, and the correspondence information (information b1 to b3) of the second device. The current state and the correspondence information of the second device are stored in the storage unit 120 if the second device is the HMD 100, in the storage unit 320 if the second device is the adapter 300, and in the storage unit 520 if the second device is the TV 500.

In Step S108, the state changing unit of the first device determines whether the current state (sending-side state/receiving-side state) of the first device and the current state (sending-side state/receiving-side state) of the second device received in Step S106 are the same or not. The current state of the first device is stored in the storage unit 120 if the second device is the HMD 100, in the storage unit 320 if the second device is the adapter 300, and in the storage unit 520 if the second device is the TV 500. In this way, the state changing unit of the first device can determine whether the states of both of the first device and the second device are the same or not, based on the latest states acquired from the second device.

If the current state of the first device and that of the second device are different (Step S108: NO), the state changing unit of the first device shifts the processing to Step S160. This is because, in this case, Miracast connection can be established in that state.

If the current state of the first device and that of the second device are the same (Step S108: YES), the state changing unit of the first device splits the processing into the following branches c1 to c3, according to the correspondence information of the first device (information b1 to b3) and the correspondence information of the second device (information b1 to b3) received in Step S106. This is because, in this case, Miracast connection cannot be established in that state.

(c1) Case where Only the First Device Supports Multiple Functions (the Second Device Supports a Single Function):

In Step S120, the state changing unit of the first device changes the current state (sending-side state/receiving-side state) of the first device. Specifically, the state changing unit changes the current state of the first device to the receiving-side state if it is the sending-side state, and changes the current state of the first device to the sending-side state if it is the receiving-side state.

(c2) Case where Only the Second Device Supports Multiple Functions (the First Device Supports a Single Function):

In Step S130, the state changing unit of the first device sends a request to change the current state (sending-side state/receiving-side state), to the second device. The second device, receiving the request, changes the current state of the second device in Step S132. Details are similar to Step S120. In Step S134, the second device sends a response that the change is successful (or failure), to the first device.

(c3) Case where Both of the First Device and the Second Device Support Multiple Functions:

In Step S140, the state changing unit of the first device notifies the second device of the apparatus wire-connected to the first device. The notification of the apparatus includes information that can specify the type of the apparatus (for example, the name of the apparatus, the name of the type of the apparatus, or the like). In the case of this embodiment, an apparatus connected via a USB interface, or an apparatus connected via an HDMI interface corresponds to the "apparatus wire-connected". In Step S142, the second device notifies the first device of the apparatus wire-connected to the second device. Details are similar to Step S140.

In Step S146, the state changing unit of the first device decides the device whose current state (sending-side state/receiving-side state) should be changed (hereinafter also referred to simply as a "target device"), according to the type of the apparatus wire-connected to the first device and the type of the apparatus wire-connected to the second device received in Step S142. Specifically, the state changing unit decides the target device in such a way that the current state of the first device becomes the same as the type of the apparatus wire-connected to the first device (type functioning as the source device or type functioning as the sink device) and that the current state of the second device becomes the same as the type of the apparatus wire-connected to the second device.

For example, if the apparatus wire-connected to the first device is a BD recorder (type functioning as the source device), the state changing unit sets the current state of the first device to the sending-side state. If the apparatus wire-connected to the second device is the TV 500 (type functioning as the sink device), the state changing unit sets the current state of the second device to the receiving-side state.

In this way, even if the device (first device) and the connection destination device (second device) are devices of types functioning as the sending-side device (source device) as a "substitute for another apparatus" such as the adapter 300 or functioning as the receiving-side device (sink device), for example, the state changing unit can decide the target device whose state is to be changed, in consideration of the types of the apparatuses connected to the device and the connection destination device.

If the type of the apparatus wire-connected to the first device and the type of the apparatus wire-connected to the second device are the "same" (for example, both are the type functioning as the source device, both are the type functioning as the sink device, or both are the type functioning both as the source device and as the sink device), the state changing unit can decide the target device, using the following methods d1 to d3. The methods d1 to d3 may be used separately or in combination.

(d1)

The state changing unit maintains the current state of the device (in the illustrated example, the first device) on the side sending the P2P connection confirmation request (Step S104), and decides the device (in the illustrated example, the second device) on the side receiving the P2P connection confirmation request, as the target device. According to the method d1, the state changing unit decides the side requested (Step S104) to start connection (Miracast connection) according to the video wireless transmission standard, as the target device whose state is to be changed. The request to start connection is often issued in response to a "user's operation" such as a start operation of a Miracast-supporting application or insertion of a disk into the apparatus, for example. In this way, the current state (sending-side state/receiving-side state) of the device on the side requesting to start connection, in other words, on the side where the user's operation is carried out, can be maintained, and it is highly likely that the target device whose state is to be changed can be decided in a way that reflects the user's intention.

(d2)

Each of the HMD 100, the adapter 300, and the TV 500 is configured to store a history of the current state (sending-side state/receiving-side state) of the own device. In this case, the storage unit of each device functions as a "history storage unit". Also, in Steps S140 and S142, the history of the current state is reported as well as the wire-connected apparatus. The state changing unit acquires the number of times the sending-side state is employed in the first device in the past and the number of times the receiving-side state is employed in the first device in the past, from the history of the current state of the first device. Similarly, the state changing unit acquires the number of times the sending-side state is employed in the second device in the past and the number of times the receiving-side state is employed in the second device in the past, from the history of the current state of the second device received in Step S142. The state changing unit decides the target device according to the acquired number of times (for example, the larger number is taken or the smaller number is taken). According to the method d2, the state changing unit can easily decide the target device whose state is to be changed, using the past histories of the device (first device) and the connection destination device (second device). Also, instead of the number of times or along with the number of times, the "time" for which the sending-side state (receiving-side state) is employed in the past may be used.

(d3)

Each of the HMD 100, the adapter 300, and the TV 500 is configured to store the priority order of devices that can be the target device, in advance. The priority order can be realized in a list format such as "1: adapter 300, 2: HMD 100", for example. The state changing unit decides the target device according to the priority order stored in the own device. According to the method d3, the state changing unit can easily decide the target device whose state is to be changed, using the predetermined priority order.

Also, the state changing unit is not limited to the case where the types of the apparatuses wire-connected to the first and second devices are the same. The target device may be decided, using (or combining) the foregoing methods d1 to d3 instead of the "decision on the target device according to the type of the wire-connected apparatus" described with reference to Steps S140 to S146. Also, the state changing unit may decide the target device, using (or combining) the foregoing methods d1 to d3 if there is a plurality of types of apparatuses wire-connected to the first and second devices.

If the second device is decided as the target device in Step S146 of FIG. 6, the state changing unit of the first device sends a request to change the current state (sending-side state/receiving-side state), to the second device (Step S148). The second device, receiving the request, changes the current state of the second device in Step S150. Details are similar to Step S120. In Step S152, the second device sends a response that the change is successful (or unsuccessful) to the first device.

If the first device is decided as the target device in Step S146, the state changing unit of the first device changes the current state (sending-side state/receiving-side state) of the first device (Step S154). In Step S156, the first device sends a response that the change is successful (or unsuccessful) to the second device.

In Step 160, the first device sends a P2P connection request (the start request in the foregoing procedure a1) to the second device. Subsequently, the foregoing procedures a1, a2 are executed between the first device and the second device, thus establishing P2P connection and Miracast connection (Step S162).

A-2-1. Initial Processing (Case where the Execution Agent is the Adapter 300):

FIG. 7 is a view explaining the initial processing in the case where the execution agent is the adapter 300. FIG. 7 illustrates the case where the first device is the adapter 300 and where the second device is the TV 500. Since the TV 500 has both of the wireless connection function and the Miracast connection function and can independently function as the sink device, the TV 500 is denoted as TV 500w in the illustration.

In Step S100 of the initial processing (FIG. 6), the state changing unit 318 of the adapter 300 detects the HMD 100 (FIG. 1) in the sending-side state and the TV 500w (FIG. 7) in the receiving-side state, as the device in the surroundings with which P2P connection can be established. In Step S104, the state changing unit 318 sends a P2P connection confirmation request to the TV 500w. In Step S106, the state changing unit 318 acquires the correspondence information 522 "single function: sink device" and the current state 524 "receiving-side state", of the TV 500w. As illustrated, the correspondence information 322 of the adapter 300 is "multiple functions", and the current state 324 is "receiving-side state".

Therefore, in Step S108, the state changing unit 318 determines that the current state of the adapter 300 and the current state of the TV 500w are the same. Since only the adapter 300 supports multiple functions (Step S110: branch c1), the state changing unit 318 changes the current state of the adapter 300 from "receiving-side state" to "sending-side state" in Step S120. Subsequently, the state changing unit 318 sends a P2P connection request to the TV 500w (Step S160), and goes through the foregoing procedures a1, a2, thus establishing Miracast connection between the adapter 300 and the TV 500w, with the adapter 300 being the source device and the TV 500w being the sink device (Step S162).

In this way, in the example of FIG. 7, if the device (adapter 300) itself has both of the function as the sending-side device and the function as the receiving-side device, the state changing unit 318 of the adapter 300 changes the state (sending-side state/receiving-side state) of the device itself. Thus, the automation of the switching between the function as the sending-side device and the function as the receiving-side device can be realized.

A-2-2. Initial Processing (Case where the Execution Agent is the TV 500):

FIG. 8 is a view explaining the initial processing in the case where the execution agent is the TV 500. FIG. 8 illustrates the case where the first device is the TV 500 and where the second device is the adapter 300. Since the TV 500 has both of the wireless connection function and the Miracast connection function and can independently function as the sink device, the TV 500 is denoted as TV 500w in the illustration.

In Step S100 of the initial processing (FIG. 6), the state changing unit 518 of the TV 500w detects the HMD 100 (FIG. 1) in the sending-side state and the adapter 300 (FIG. 8) in the receiving-side state, as the device in the surroundings with which P2P connection can be established. In Step S104, the state changing unit 518 sends a P2P connection confirmation request to the adapter 300. In Step S106, the state changing unit 518 acquires the correspondence information 322 "multiple functions" and the current state 324 "receiving-side state", of the adapter 300. As illustrated, the correspondence information 522 of the TV 500w is "single function: sink device", and the current state is "receiving-side state".

Therefore, in Step S108, the state changing unit 518 determines that the current state of the TV 500w and the current state of the adapter 300 are the same. Since only the adapter 300 supports multiple functions (Step S110: branch c2), the state changing unit 518 changes the current state of the adapter 300 from "receiving-side state" to "sending-side state" in Steps S130 and S132. Subsequently, the state changing unit 518 sends a P2P connection request to the adapter 300 (Step S160), and goes through the foregoing procedures a1, a2, thus establishing Miracast connection between the TV 500W and the adapter 300, with the adapter 300 being the source device and the TV 500w being the sink device (Step S162).

In this way, in the example of FIG. 8, if the device (TV 500w) itself has one of the function as the sending-side device and the function as the receiving-side device, the state changing unit 518 of the TV 500w changes the state (sending-side state/receiving-side state) of the connection destination device (adapter 300). Thus, the automation of the switching between the function as the sending-side device and the function as the receiving-side device can be realized.

A-2-3. Initial Processing (Case where the Execution Agent is the HMD 100):

FIG. 9 is a view explaining the initial processing in the case where the execution agent is the HMD 100. FIG. 9 illustrates the case where the first device is the adapter 300 and where the second device is the HMD 100. It is assumed that the TV 500 does not have the wireless connection function and cannot independently function as the sink device.

In Step S100 of the initial processing (FIG. 6), the state changing unit 318 of the adapter 300 detects the HMD 100 (FIG. 9) in the sending-side state, as the device in the surroundings with which P2P connection can be established. The TV 500 does not have the wireless connection function and therefore is not detected here. In Step S104, the state changing unit 318 sends a P2P connection confirmation request to the HMD 100. In Step S106, the state changing unit 318 acquires the correspondence information 122 "multiple functions" and the current state 124 "sending-side state", of the HMD 100. As illustrated, the correspondence information 322 of the state changing unit 318 is "multiple functions", and the current state 324 is "sending-side state".

Therefore, in Step S108, the state changing unit 318 determines that the current state of the adapter 300 and the current state of the HMD 100 are the same. Since both of the adapter 300 and the HMD 100 support multiple functions (Step S110: branch c13), the state changing unit 318 notifies the HMD 100 of the apparatus wire-connected to the adapter 300 "TV 500 (FIG. 1)" in Step S140. Also, in Step S142, the state changing unit 318 acquires the apparatus wire-connected to the HMD 100 "none", from the HMD 100. In Step S146, the state changing unit 318 decides the adapter 300 as the target device in order to make the current state of the adapter 300 the same (type functioning as the sink device). In Step S154, the state changing unit 318 changes the current state of the adapter 300 from "sending-side state" to "receiving-side state". Subsequently, the state changing unit 318 sends a P2P connection request to the HMD 100 (Step S160), and goes through the foregoing procedures a1, a2, thus establishing Miracast connection between the adapter 300 and the HMD 100, with the HMD 100 being the source device and the adapter 300 being the sink device (Step S162).

In this way, in the example of FIG. 9, if both of the device (adapter 300) and the connection destination device (HMD 100) have both of the function as the sending-side device and the function as the receiving-side device, the state changing unit 318 of the adapter 300 decides one device whose state (sending-side state/receiving-side state) is to be changed (target device; in the above example, the adapter 300) from among the device and the connection destination device, and changes the state of the decided one. Thus, the automation of the switching between the function as the sending-side device and the function as the receiving-side device can be realized.

As described above, under the video wireless transmission standard (Miracast) for transmitting a video via one-to-one direct wireless communication (P2P communication), one of the two devices (first device, second device) connected on a one-to-one basis needs to function as the sending-side device (source device), and the other needs to function as the receiving-side device (sink device). If both of the two devices function as the receiving-side device (or both as the sending-side device), the connection according to the video wireless transmission standard (Miracast connection) cannot be established. According to the initial processing in the embodiment (FIG. 6), if both of the device (first device) and the connection destination device (second device) are in the sending-side state of functioning as the video sending-side device, or in the receiving-side state of functioning as the video receiving-side device, the state changing unit (the state changing unit 144 of the HMD 100, the state changing unit 318 of the adapter 300, the state changing unit 518 of the TV 500) changes the state (sending-side state/receiving-side state) of one of the device and the connection destination device prior to the establishment of connection according to the video wireless transmission standard, and therefore can avoid the foregoing problem and establish the connection according to the video wireless transmission standard. Also, the state changing unit can automatically switch between the sending-side state of functioning as the sending-side device and the receiving-side state of functioning as the receiving-side device, and therefore can avoid troubling the user and improve user-friendliness. As the result of these, according to the initial processing in the embodiment (FIG. 6), the switching between the function as the sending-side device and the function as the receiving-side device can be automated in the device (the HMD 100, the adapter 300, the TV 500) sending or receiving a video according to the video wireless transmission standard for transmitting a video via one-to-one direct wireless communication.

B. Modifications:

In the embodiment, apart of the configurations realized by hardware may be replaced by software, and conversely a part of the configurations realized by software may be replaced by hardware. Also, modifications can be made as follows.

Modification 1:

In the embodiment, the configuration of the video display system is illustrated. However, the configuration of the video display system can be arbitrarily determined without departing from the scope of the invention. For example, addition, deletion, conversion or the like of components can be made.

For example, the adapter and the apparatus connected to the adapter (in the example of FIG. 1, the TV) may be wirelessly connected together.

For example, the video display system may include other devices instead of the above respective devices or along with the above respective devices. For example, a smartphone, tablet terminal, personal computer or the like may be used as the source device. For example, a projector, display, speaker or the like may be used as the sink device.

For example, each functional unit (connection control unit, state changing unit, or the like) provided in the HMD, the adapter, and the TV may be configured using an ASIC (Application Specific Integrated Circuit) designed to realize the function in question.

For example, the correspondence information and the current state provided in the HMD, the adapter, and the TV may be stored in a server connected via the internet, for example. In this case, in the initial processing, the state changing unit may acquire the correspondence information and the current state of the "second device" from the server.

Modification 2:

In the embodiment, the configuration of the HMD is illustrated. However, the configuration of the HMD can be arbitrarily determined without departing from the scope of the invention. For example, addition, deletion, conversion or the like of each configuration part can be made.

The allocation of components to the control unit and the image display unit in the embodiment is simply an example, and various forms can be employed. For example, the following forms may be employed:

(i) the control unit is equipped with processing functions such as CPU and memory, and the image display unit is equipped only with the display function;

(ii) both of the control unit and the image display unit are equipped with processing functions such as CPU and memory;

(iii) the control unit and the image display unit are integrated together (for example, the image display unit includes the control unit and functions as an eyeglass-type wearable computer);

(iv) a smartphone or portable game machine is used instead of the control unit; and (v) the control unit and the image display unit are connected together by connection via a wireless signal transmission channel such as wireless LAN, infrared communication, or Bluetooth, and the connection unit (cord) is eliminated. In this case, the supply of electricity to the control unit or the image display unit may be wirelessly carried out.

FIG. 10 is an explanatory view showing the external configuration of an HMD according to a modification. An image display unit 20x in FIG. 10(A) has a right optical image display section 26x and a left optical image display section 28x. These are formed in such a way as to be smaller than the optical members in the embodiment and are arranged obliquely above the left and right eyes of the user, respectively, when the user wears the HMD. An image display unit 20y in FIG. 10(B) has a right optical image display section 26y and a left optical image display section 28y. These are formed in such a way as to be smaller than the optical members in the embodiment and are arranged obliquely below the left and right eyes of the user, respectively, when the user wears the HMD. In this way, it suffices that the optical image display unit is arranged near the user's eyes. The size of the optical members forming the optical image display unit may be arbitrary. A configuration in which the optical image display unit covers only a part of the user's eyes, that is, a configuration in which the optical image display unit does not completely cover the user's eyes, may be employed as well.

For example the HMD is described as a both-eye transmission-type HMD. However, a single-eye-type HMD may be employed as well. For example, the HMD may be configured as a non-transmission-type HMD in which the transmission of the external scenery is shut off in the state where the user wears the HMD, or as a video see-through device including a non-transmission-type HMD equipped with a camera. For example, as the earphones, a behind-the-ear type or headband type may be employed. Also, the earphones may be omitted.

For example, an ordinary flat display device (liquid crystal display device, plasma display device, organic EL display device or the like) may be employed instead of the image display unit worn like eyeglasses. In this case, too, the connection between the control unit and the image display unit may be either wired or wireless. Thus, the control unit can be used as a remote controller of the ordinary flat display device. For example, instead of the image display unit worn like eyeglasses, image display units in other forms may also be employed, such as an image display unit worn like a hat, or a built-in image display unit in a body protector such as a helmet. For example, the image display unit may also be configured as a head-up display (HUD) installed in vehicles such as automobile and aircraft or in other transportation measures.

Modification 3:

In the embodiment, an example of the initial processing is described. However, the procedures of processing described in the embodiment are simply an example, and various modifications can be made. For example, a part of the steps may be omitted and other steps may be added. The order of steps to be executed may be changed as well.

For example, WiFi-Direct is given as an example of one-to-one direct wireless communication, and Miracast is given as an example of various video wireless transmission standards for transmitting a video or the like via one-to-one direct wireless communication. However, these are simply examples. The communication between the device (first device) and the connection destination device (second device) may be in conformity with standards/systems other than WiFi-Direct and Miracast.

For example, the initial processing is described as being executed before the establishment processing of Miracast connection (the foregoing procedures a1, a2). However, the initial processing may be executed during the establishment processing of P2P connection (procedure a1), for example. Also, the initial processing may be executed during the establishment processing of Miracast connection (procedure a2).

For example, in the history storage unit, a history other than the history of the current state (sending-side state/ receiving-side state) of the own device may be stored. As the history other than the current state, the history of the apparatus (TV or the like) connected to the own device may be employed, for example. Thus, the target device whose state is to be changed can be decided based on the past circumstances of the first device and the second device.

Modification 4:

The invention is not limited to the above embodiment, examples and modifications, and can be realized with various configurations without departing from the scope of the invention. For example, technical features in the embodiment, examples and modifications corresponding to technical features in the respective forms described in the summary of the invention can be substituted or combined when appropriate, in order to solve a part or the whole of the foregoing problem or in order to achieve a part or the whole of the foregoing advantageous effects. Also, the technical features can be deleted when appropriate, if the technical features are not described as essential in the specification.

REFERENCE SIGNS LIST

10 . . . control unit, 11 . . . enter key, 12 . . . lighting part, 13 . . . display switch key, 14 . . . track pad, 15 . . . luminance switch key, 16 . . . direction key, 17 . . . menu key, 18 . . . power switch, 20 . . . image display unit, 21 . . . right holding section, 22 . . . right display drive section, 23 . . . left holding section, 24 . . . left display drive section, 26 . . . right optical image display section, 28 . . . left optical image display section, 30 . . . earphone plug, 32 . . . right earphone, 34 . . . left earphone, 40 . . . connection unit, 42 . . . right cord, 44 . . . left cord, 46 . . . connection member, 48 . . . main body cord, 51 . . . sending unit, 53 . . . receiving unit, 61 . . . camera, 66 . . . nine-axis sensor, 100 . . . head-mounted display (device, connection destination device), 110 . . . input information acquisition unit, 120 . . . storage unit, 122 . . . correspondence information, 124 . . . current state, 130 . . . power source, 132 . . . wireless communication unit, 140 . . . CPU, 142 . . . connection control unit, 144 . . . state changing unit, 150 . . . OS, 160 . . . image processing unit, 170 . . . audio processing unit, 180 . . . interface, 190 . . . display control unit, 201 . . . right backlight control unit (image light generation unit), 202 . . . left backlight control unit (image light generation unit), 211 . . . right LCD control unit (image light generation unit), 212 . . . left LCD control unit (image light generation unit), 221 . . . right backlight (image light generation unit), 222 . . . left backlight (image light generation unit), 241 . . . right LCD (image light generation unit), 242 . . . left LCD (image light generation unit), 251 . . . right projection system, 252 . . . left projection system, 261 . . . right light guide plate (optical image display unit), 262 . . . left light guide plate (optical image display unit), 300 . . . adapter (device, connection destination device), 301 . . . power button, 303 . . . pass-through button, 305 . . . changeover switch, 307 . . . LED, 310 . . . CPU, 311 . . . OS, 312 . . . USB control unit, 313 . . . HDMI control unit, 314 . . . wireless control unit, 315 . . . pass-through control unit, 316 . . . connection control unit, 318 . . . state changing unit, 320 . . . storage unit, 322 . . . correspondence information, 324 . . . current state, 330 . . . power source, 340 . . . USB interface, 350 . . . HDMI interface, 360 . . . wireless communication interface, 500 . . . TV (device, connection destination device), 510 . . . CPU, 513 . . . HDMI control unit, 514 . . . wireless control unit, 516 . . . connection control unit, 518 . . . state changing unit, 520 . . . storage unit, 522 . . . correspondence information, 524 . . . current state, 530 . . . power source, 550 . . . HDMI interface, 560 . . . wireless communication interface, 1000 . . . video display system, VSync . . . vertical synchronization signal, HSync . . . horizontal synchronization signal, Data . . . image data, OA . . . external device, PC . . . personal computer, VI . . . virtual image, SC . . . external scenery, VR . . . field of view, RE . . . right eye, LE . . . left eye.

The invention claimed is:

1. A device for sending or receiving a video according to a video wireless transmission standard for transmitting a video via one-to-one wireless communication, the device comprising:
a processor or integrated circuit programmed to:
control establishment of a connection according to the video wireless transmission standard between the device and a connection destination device, wherein both the device and the connection destination device are configured to function as the sending-side device and the receiving-side device; and
change a state of one of the device and the connection destination device prior to the establishment of the connection in response to either: (i) both of the device and the connection destination device being in a sending-side state of functioning as a sending-side device of the video, or (ii) both of the device and the connection destination device being in a receiving-side state of functioning as a receiving-side device of the video, wherein:
if the states of both of the device and the connection destination device are the same, the processor or integrated circuit decides a target device whose state is to be changed, from among the device and the connection destination device, including:
acquiring a type of an apparatus connected to the device,
acquiring a type of an apparatus connected to the connection destination device, and
deciding the target device according to the type of the apparatus connected to the device and the type of the apparatus connected to the connection destination device,
if the target device is the device, the processor or integrated circuit changes the state of the device, and
if the target device is the connection destination, the processor or integrated circuit changes the state of the connection destination device by sending a request to change the state of the connection destination device, to the connection destination device.

2. The device according to claim 1, wherein
the processor or integrated circuit acquires the state of the connection destination device and determines whether the states of both of the device and the connection destination device are the same or not, based on the acquired state.

3. The device according to claim 1, wherein
the processor or integrated circuit changes the state of the device if the states of both of the device and the connection destination device are the same.

4. The device according to claim 1, wherein
the processor or integrated circuit changes the state of the connection destination device by sending a request to change the state of the connection destination device, to the connection destination device, if the states of both of the device and the connection destination device are the same.

5. The device according to claim 1, wherein
the processor or integrated circuit decides the target device according to a predetermined priority order.

6. A device for sending or receiving a video according to a video wireless transmission standard for transmitting a video via one-to-one wireless communication, the device comprising:
a processor or integrated circuit programmed to:
control establishment of a connection according to the video wireless transmission standard between the device and a connection destination device, wherein both the device and the connection destination device are configured to function as the sending-side device and the receiving-side device; and
change a state of one of the device and the connection destination device prior to the establishment of the connection in response to either: (i) both of the device and the connection destination device being in a sending-side state of functioning as a sending-side device of the video, or (ii) both of the device and the connection destination device being in a receiving-side state of functioning as a receiving-side device of the video, wherein:
if the states of both of the device and the connection destination device are the same, the processor or integrated circuit decides a target device whose state is to be changed, from among the device and the connection destination device, including:
deciding the connection destination device as the target device if a request to start the connection is sent from the device, and
deciding the device as the target device if a request to start the connection is received from the connection destination device,
if the target device is the device, the processor or integrated circuit changes the state of the device, and
if the target device is the connection destination, the processor or integrated circuit changes the state of the connection destination device by sending a request to change the state of the connection destination device, to the connection destination device.

7. A device for sending or receiving a video according to a video wireless transmission standard for transmitting a video via one-to-one wireless communication, the device comprising:
a memory storing a history about a number of times or a time period for which the sending-side state is employed in the device in the past, and a number of times or a time period for which the receiving-side state is employed in the device in the past; and
a processor or integrated circuit operatively coupled to the memory, the processor or integrated circuit being programmed to:
control establishment of a connection according to the video wireless transmission standard between the device and a connection destination device, wherein both the device and the connection destination device are configured to function as the sending-side device and the receiving-side device; and
change a state of one of the device and the connection destination device prior to the establishment of the connection in response to either: (i) both of the device and the connection destination device being in a sending-side state of functioning as a sending-side device of the video, or (ii) both of the device and the connection destination device being in a receiving-side state of functioning as a receiving-side device of the video, wherein:
if the states of both of the device and the connection destination device are the same, the processor or integrated circuit decides a target device whose state is to be changed, from among the device and the connection destination device, including:
acquiring the history of the connection destination device, and
deciding the target device according to the history of the device and the history of the connection destination device,
if the target device is the device, the processor or integrated circuit changes the state of the device, and
if the target device is the connection destination, the processor or integrated circuit changes the state of the connection destination device by sending a request to change the state of the connection destination device, to the connection destination device.

8. A method for controlling a device, the method comprising:
controlling establishment of a connection according to a video wireless transmission standard for transmitting a video via one-to-one wireless communication, between the device and a connection destination device, wherein both the device and the connection destination device are configured to function as the sending-side device and the receiving-side device; and
changing a state of one of the device and the connection destination device prior to the establishment of the connection in response to either: (i) both of the device and the connection destination device being in a sending-side state of functioning as a sending-side device of the video, or (ii) both of the device and the connection destination device being in a receiving-side state of functioning as a receiving-side device of the video, wherein:
if the states of both of the device and the connection destination device are the same, the processor or integrated circuit decides a target device whose state is to be changed, from among the device and the connection destination device, including:
acquiring a type of an apparatus connected to the device,
acquiring a type of an apparatus connected to the connection destination device, and
deciding the target device according to the type of the apparatus connected to the device and the type of the apparatus connected to the connection destination device,
if the target device is the device, the processor or integrated circuit changes the state of the device, and
if the target device is the connection destination, the processor or integrated circuit changes the state of the connection destination device by sending a request to change the state of the connection destination device, to the connection destination device.

9. A method for controlling a device, the method comprising:
controlling establishment of a connection according to a video wireless transmission standard for transmitting a video via one-to-one wireless communication, between the device and a connection destination device, wherein both the device and the connection destination device are configured to function as the sending-side device and the receiving-side device; and
changing a state of one of the device and the connection destination device prior to the establishment of the connection in response to either: (i) both of the device and the connection destination device being in a sending-side state of functioning as a sending-side device of the video, or (ii) both of the device and the connection destination device being in a receiving-side state of functioning as a receiving-side device of the video, wherein:
if the states of both of the device and the connection destination device are the same, the processor or integrated circuit decides a target device whose state is to be changed, from among the device and the connection destination device, including:
deciding the connection destination device as the target device if a request to start the connection is sent from the device, and
deciding the device as the target device if a request to start the connection is received from the connection destination device,
if the target device is the device, the processor or integrated circuit changes the state of the device, and
if the target device is the connection destination, the processor or integrated circuit changes the state of the connection destination device by sending a request to change the state of the connection destination device, to the connection destination device.

10. A method for controlling a device, the method comprising:
providing a history about a number of times or a time period for which the sending-side state is employed in the device in the past, and a number of times or a time period for which the receiving-side state is employed in the device in the past; and
controlling establishment of a connection according to a video wireless transmission standard for transmitting a video via one-to-one wireless communication, between the device and a connection destination device, wherein both the device and the connection destination device are configured to function as the sending-side device and the receiving-side device; and changing a state of one of the device and the connection destination device prior to the establishment of the connection in response to either: (i) both of the device and the connection destination device being in a sending-side state of functioning as a sending-side device of the video, or (ii) both of the device and the connection destination device being in a receiving-side state of functioning as a receiving-side device of the video, wherein:

if the states of both of the device and the connection destination device are the same, the processor or integrated circuit decides a target device whose state is to be changed, from among the device and the connection destination device, including:
   acquiring the history of the connection destination device, and
   deciding the target device according to the history of the device and the history of the connection destination device, if the target device is the device, the processor or integrated circuit changes the state of the device, and if the target device is the connection destination, the processor or integrated circuit changes the state of the connection destination device by sending a request to change the state of the connection destination device, to the connection destination device.

\* \* \* \* \*